United States Patent
Lidström et al.

(10) Patent No.: US 8,429,175 B2
(45) Date of Patent: Apr. 23, 2013

(54) METHOD AND APPARATUS FOR DEFAULT RATING ESTIMATION

(75) Inventors: Mattias Lidström, Stockholm (SE); Jonas Bjork, Stockhollm (SE); Joakim Soderberg, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 52 days.

(21) Appl. No.: 13/124,466

(22) PCT Filed: Oct. 17, 2008

(86) PCT No.: PCT/SE2008/000602
§ 371 (c)(1), (2), (4) Date: Apr. 15, 2011

(87) PCT Pub. No.: WO2010/044712
PCT Pub. Date: Apr. 22, 2010

(65) Prior Publication Data
US 2011/0208752 A1    Aug. 25, 2011

(51) Int. Cl.
*G06F 7/08* (2006.01)
*G06F 17/30* (2006.01)

(52) U.S. Cl.
USPC .......................................... 707/749; 707/748

(58) Field of Classification Search ........... 707/999.005, 707/999.006, 999.102, 688, 748, 749
See application file for complete search history.

(56) References Cited

U.S. PATENT DOCUMENTS 7,756,879 B2 * 7/2010 Parsons et al. ................ 707/748
2005/0125307 A1 * 6/2005 Hunt et al. ..................... 705/26
2007/0118546 A1 * 5/2007 Acharya ........................ 707/101
2009/0083258 A1 * 3/2009 Koren et al. ...................... 707/5
2010/0088265 A1 * 4/2010 Pohl ............................... 706/46

OTHER PUBLICATIONS

"Compound Poisson distribution and GLM's—Tweedie's distribution," R. Kass, Dept of Quantitative Economics, Universiteit van Amsterdam, The Netherlands, talk given at 3rd Actuarial and Financial Mathematics Day Feb. 4, 2005.*
"Collaborative filtering with interlaced generalized linear models," N. Delannay et al, Universite catholique de Louvain (UCL), DICE-Machine Learning Group, Jan. 26, 2008.*
European Patent Office. "Notice from the European Patent Office dated Oct. 1, 2007 Concerning Business Methods." Official Journal of the European Patent Office, Munich, Germany, vol. 30, No. 11, Nov. 1, 2007.

* cited by examiner

*Primary Examiner* — Bruce Moser
(74) *Attorney, Agent, or Firm* — Coats & Bennett, P.L.L.C.

(57) ABSTRACT

A method of estimating a default rating of a rated dataset is provided, where the dataset comprises at least one series of ratings associated with at least one user and each series comprise ratings associated with at least two items. For a reference user and an item for which a rated value is missing the item's average rating, $i_r$, the reference users average rating, $R_u$, and the datasets average rating, $d_r$, is collected. A Poisson distribution of the reference users rating is then generated on the basis of the reference users average rating. A random Poisson rating, $u_r$, is calculated on the basis of the Poisson distribution, and a default rating, r, is estimated by weighting the random Poisson rating on the basis of the items average rating, the users average rating and the datasets average rating.

19 Claims, 6 Drawing Sheets

METHOD AND APPARATUS FOR DEFAULT RATING ESTIMATION

TECHNICAL FIELD

The present invention relates to an improved method for estimating a default rating, and an apparatus for executing such a method.

BACKGROUND

There are many situations where it is useful to be able to distinguish and interpret patterns of user data, that, to at least to some extend, reflects the preferences of the user. For a number of users that have rated a number of items such a recognised pattern may e.g. be used for distinguishing certain items or users from each other in order to be able to select or rank the items or users which are considered to have most in common with a reference item or user under the present circumstances. In a typical situation, automatic predictions which have been based on interests or preferences of a number of users may be used for obtaining some kind of ranking or intelligent selection. Such predictions typically rely on collected information which has been filtered, using some filtering mechanism, and on the underlying assumption that those users who had a similar taste in the past often tend to agree also in the near future. Such a principle may be applicable for various recommendation systems which are adapted to selectively distinguish users that have a similar "preference pattern" from a group of users. Such a recommendation system, may typically be directed to a recommendation of an asset, such as e.g. music, movies, restaurants or travelling destinations.

Collaborative filtering is one of the most successful methods used in present commercial product recommendation systems. The collaborative filtering concept is heavily based on filtering information collectable from data sources and user profiles in a collaborative manner in order to find correlations between users or items. The need of an automated system that provides personalized recommendations that are accurate, scalable and efficient has actually increased with practically the same rate as the increasing amount of available data.

The main task in collaborative filtering is to predict a reference user's preference for a certain item, on the basis of other users' preferences. Collected data of the reference user is matched against data of other users in order to identify the users having similar preferences or tastes as the reference user. These users are typically referred to as neighbours. Because of the discovered relationship in taste, items preferred by the neighbours which are new to the reference user will then be recommended to the reference user.

In collaborative filtering the data to be processed is typically represented by a user-item matrix, R, as illustrated with FIG. 1. In the figure, matrix R comprises rating data, typically provided by m users, $u_1 \ldots u_m$, where each user is represented by a row-vector, in an n-dimensional space capable of covering n items. For each of the items in the matrix a rating, $R_{1,1} \ldots R_{m,n}$, respectively, can be specified by a respective user, where each item in the matrix is represented by a column-vector in an m-dimensional space. In a typical scenario each position in the matrix will either comprise a rating that has been given to the respective item by a respective user, or be blank, for the occasion that the user for some reason has not rated that particular item.

Normally there are much more items in a dataset that are un-rated than items that have actually been rated, and thus, the co-rated item space between two users will have few dimensions to consider, by the recommender system.

The Movielens® dataset, is a publicly available dataset that can be used for testing and evaluating different recommender systems. The distribution of this dataset, that comprises 100 000 ratings on 1 682 items from 943 users, represented as the number of users having a certain number of co-rated items, is illustrated in the diagram of FIG. 2. According to this diagram, the most common number of co-rated items, given by the peak of the graph, is 3 items, i.e. out of 1 682 items, only 3 items have been co-rated by the largest group of users. A big challenge in collaborative filtering is therefore to be able to handle such sparsely rated data sets, and to obtain a reliable prediction also on the basis of a very limited amount of rating data.

In "Empirical Analysis of Predictive Algorithms for Collaborative Filtering", 1998, pages 43-58, by John S. Breese, David Heckerman and Carl Kadie, it has been suggested that a default preference is inferred to the items of a sparse dataset for which no explicit preference, or rate has been given by a user. It is suggested that in such a case, a default preference is computed, which is based on the union of two users preferences, instead of the intersection of the users preferences. In addition to the union of the preferences, it is also suggested that a number of additional items is included to the rated data. In order to avoid biased results, the document also suggests that such a default preference is chosen as a neutral, or somewhat negative, preference.

In "Collaborative filtering with decoupled models for preferences and ratings", 2003, pages 309-316, by Rong Jin, Luo S I, ChengXiang Zhai and Jamie Callen, any possible difference in performance when using item average rating as an item default preference or when using the user average rating as user default preference, is examined. The result of these examinations indicates an almost identical performance.

In "Evaluating collaborative filtering systems" ACM Trans. Inf. Syst. 22(1):5-53, by Jonathan L. Herlocker, Joseph A. Konstan, Loren G. Terveen and John T. Riedl, the importance of having an algorithm and a dataset that is designed to support each other has been demonstrated. It is proposed that a recommendation system that is designed to produce recommendations for items, such as e.g. movies, that are appreciated by a reference user, will be dominated by higher ratings mainly since people tend to rate what they watch, and watch the movies that they like.

However, not much research has been made on how to improve an inferred default rating so that a user's rating profile is maintained after default ratings have been added to a dataset. Existing default preferences, such as the ones described in the documents referred to above, are based solely on either the users average rating, or on the items average rating. As for presently used default rating schemes, no account is however taken to how the users ratings and the items ratings are distributed.

SUMMARY

The object of the present invention is to address at least some of the problems outlined above. More specifically, it is an object of the present invention to provide a method and an apparatus that is adapted to estimate at least one default rating when a value is missing in a dataset comprising rated values associated with a reference user and some items out of a series of rateable items, such that the one or more estimated values will be representative for the series of items that have already been rated.

According to one aspect, a method of estimating a default rating for a rated dataset is provided, where the dataset comprises at least one series of ratings associated with at least one user, and where each series comprising ratings associated with at least two items. The method comprises the following steps:
a) recognising a trigger for estimating a default rating for a reference user and an item for which a rating is missing,
b) collecting the items average rating, $i_r$, the reference users average rating, $\overline{R}_u$, and the datasets average rating, $d_r$,
c) generating a Poisson distribution of the reference users rating on the basis of the reference users average rating,
d) calculating a random Poisson rating, $u_r$, on the basis of the Poisson distribution, and
e) estimating a default rating, $\hat{r}$, by weighting the random Poisson rating on the basis of the items average rating, the users average rating and the datasets average rating.

According to another aspect, also an apparatus adapted to execute the method for estimating a default rating is provided. Such an apparatus may typically be referred to as a default rating engine.

According to yet another aspect, a system suitable for execution of the suggested estimating method is provided. Such a system may be provided as a distributed, or as an integrated system.

By introducing the suggested weighting of the estimated default rating, more dimensions will be considered, and, thus, estimated ratings will reflect the pattern of already rated values of a dataset in a better way, i.e. a user's rating profile will be maintained to a higher degree, than if a conventional method is used for estimating a missing rating.

In addition, a dataset to which default ratings obtained by the proposed default rating method will not be "flattened out", due to the use of the Poisson distribution.

BRIEF DESCRIPTION OF THE DRAWINGS

The present invention will now be described in more detail by means of exemplary embodiments and with reference to the accompanying drawings, in which.

DETAILED DESCRIPTION

Figures 1, 2:
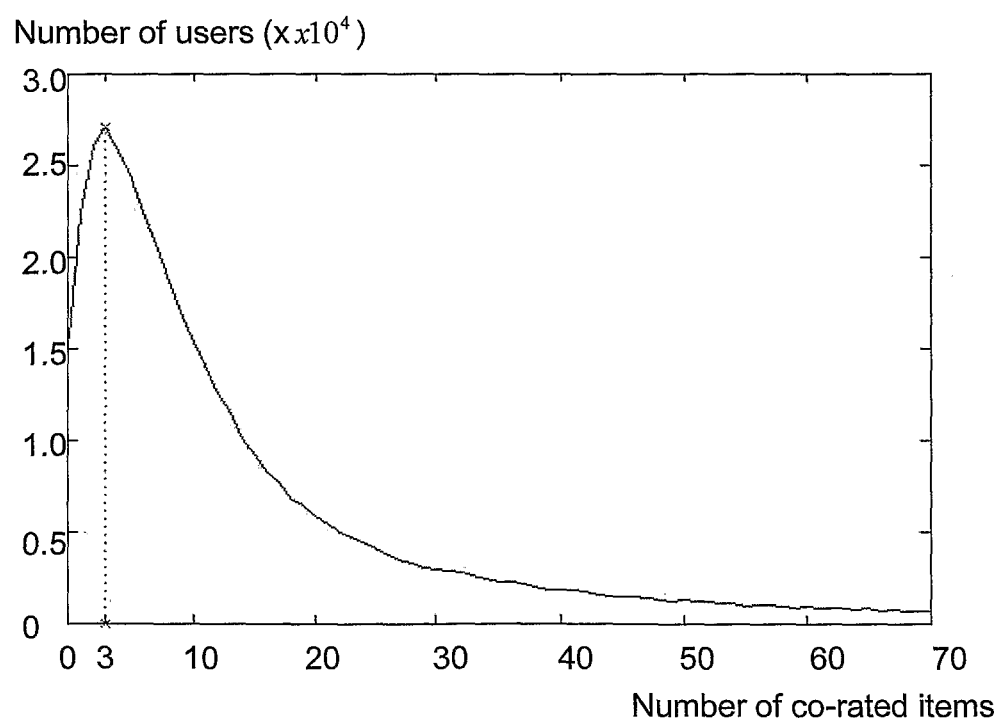
FIG. 1 is an exemplary illustration of a user-item matrix R, for storing ratings of n items associated with m users, or vice versa, according to the prior art.
FIG. 2 is a diagram illustrating a typical distribution of the number of co-rated items of a rated dataset, according to the prior art.

Briefly described the present invention refers to a method and an apparatus adapted to estimate a missing rating, from herein after referred to as a default rating, such that a series of ratings that has been given for a number of items is supplemented with a value that is representative of the ratings already given for the respective series.

It is to be understood that in the present context the term rating does not only refer to values that have been determined on the basis of a user's subjective judgements, but also to values that have been selected on more or less objective grounds, such as e.g. a determined quality. Ratings may be expressed, either explicitly on a numeric scale or by ranking items, or implicitly, such as e.g. a value expressing the time spent on viewing a specific item. Consequently, a rated dataset should be interpreted so that it can also disclose a dataset that has been graded on any possible grounds.

A typical application for using a series of rated values that has been processed according to the suggested method is in association with collaborative filtering. In collaborative filtering a series of ratings given by a reference user for a number of items is correlated with the corresponding ratings given by other users. As indicated above, generally most users have only rated a small fraction of all rateable items of a rateable asset, and, thus, such a correlated dataset is typically very sparse, and as a consequence, the co-rated item space between two correlated users will only be expressed in a few dimensions. Due to the sparse dataset there is therefore a considerable risk that such a prediction will be inconclusive.

According to "Evaluating collaborative filtering systems", referred to above, the granularity of the user's preferences is often different than the range and granularity of the ratings that has been given by the users. This may e.g. be exemplified with a rating scale that ranges between 1 and 5, where a one-star error that predicts a 4 as a 5 or a 2 as a 1 will practically make no difference to a recommending result given to a reference user. Hence it is often desirable to have a rating distribution with similar probabilities on close ratings in the ends of the ratings scale.

In addition, in order to be able to obtain a ratings dataset that maintains the rating profile of a series of sparsely rated items also after one or more default ratings have been computed and added to the series, an improved default rating method is suggested. According to the suggested method, a Poisson distribution is used as a model for estimating a missing rating, r. According to this method, the probability for different possible ratings can be defined for different λ, such that:

$$\text{probability}(r, \lambda) = \frac{\lambda^r e^{-\lambda}}{r!} \qquad (1)$$

In order to obtain a representative model for a reference users rating profile, λ is calculated on the basis of the user's average rating, $\overline{R}_u$, i.e. λ will reflect whether a user tend to give a larger amount of lower or higher rates. Since the Poisson distribution requires a λ that is larger than 0 it is necessary to scale the possible ratings to positive values. The model described here is based on a rating interval [1,5]. If the ratings are within a different range, the ratings need to be scaled to the range [1,5] in order to adapt the rated dataset to the processing. Consequently, λ should be a value within the range min(R)+1≤λ≤max(R). This condition asserts that λ will be in the range [2,5], which is required for the Poisson distribution to exhibit the desired form, where R represents the set of all possible ratings. Since the possible ratings for an asset range between 1 and 5, R will be defined as a set, comprising {1,2,3,4,5}, and, consequently, λ will be in the range of $2 \leq \lambda \leq 5$.

Figure 3:
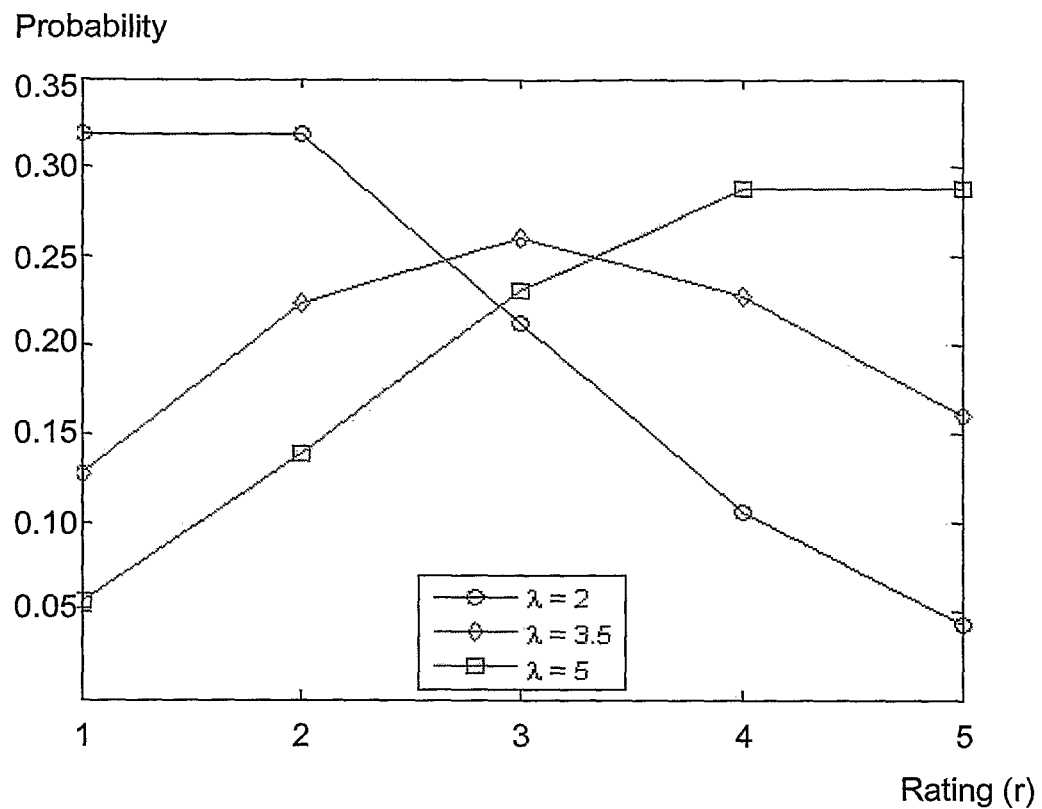
FIG. 3 is a diagram illustrating three different examples of Poisson distributions and their corresponding probabilities for each rating.

Three different exemplary Poisson distributions, each computed on the basis of a different λ, namely λ=2, λ=3.5 and λ=5 are illustrated in the diagram of FIG. 3. From the figure it is obvious that λ=2 illustrates a situation where a majority of the rates given by a user are represented by low rates, i.e. 1 or 2, while λ=5 illustrates a situation where instead a majority of the given rates are high, i.e. 4 or 5. A third Poisson distribution has also been computed on the basis of a λ=3.5. The latter distribution resembles a normal distribution, where a majority of the rates have been given in the mid-section of the rating range.

The value of λ is a linear function of the average rating, $\overline{R}_u$, which means that a rating that is estimated on the basis of the Poisson distribution described above will be based on the known user ratings. A λ for a user, u, from hereinafter referred to as the reference user, can therefore be defined as:

$$\lambda_u = a\overline{R}_u + b \quad (2)$$

Given that $\lambda_u$ is in the range of $\min(R)+1 \leq \lambda_u \leq \max(R)$, function (2) will range between:

$$a \cdot \max(R) + b = \max(R) \quad (3)$$

and $$a \cdot \min(R) + b = \min(R) + 1 \quad (4)$$

On the basis of the given range, a and b can be expressed as:

$$a = 1 - \frac{1}{\max(R) - \min(R)} \quad (5)$$

and $$b = \frac{\max(R)}{\max(R) - \min(R)} \quad (6)$$

In the given example with a rating scale ranging between 1 and 5, the linear function (2) thus can be expresses as:

$$\lambda_u = 0.75\overline{R}_u + 1.25 \quad (7)$$

Given a certain $\lambda_u$ for a series of ratings associated with the reference user, u, a rating, $u_r$, which can also be referred to as a Random Poisson Distributed Rating, is then estimated for the un-rated item i, on the basis of the probability derived from function (1).

In order to be able to compute a default rating that reflects the distribution of both the ratings given by the reference user and the ratings given for a respective item, a weighting function is suggested, such that a default rating $\hat{r}(\lambda_u)$ can be estimated from:

$$\hat{r}(\lambda_u) = \frac{u_{num} \cdot u_r + i_{num} \cdot i_r + d_{avgNum} \cdot d_r}{u_{num} + i_{num} + d_{avgNum}} \quad (8)$$

where $i_r$ is another estimated rating which is based on the ratings of item i. In this case the average rating of item i is used for computing this measure. $d_r$ is yet another estimated rating, which is based on the entire dataset that is considered. Here the datasets average rating is used for this computation. $u_{num}$ is the number of explicit ratings given by reference user u, $i_{num}$ is the explicit number of ratings given by all users of the dataset for item i, and $d_{avgNum}$ is the average number of ratings for the items of the computed dataset. The first factor of the numerator of function (8), which has been generated from the Poisson distribution and weighted by the number of data points used, depends on, and will maintain the rating distribution of the reference user, u. The second and the third factors of the numerator depend on each items average rating and the datasets average, respectively. These factors will make sure that the default rating will reflect also these both aspects. All three factors are weighted by the respective number of data points used. The variables in the denominator serve as scaling constants, which assure that the predicted rating will be in the correct interval.

A method for estimating, or inferring, a rating for an item on the basis of the weighted default rating scheme defined above will now be described in further detail with reference to the flow chart of FIG. 5.

As a prerequisite, it is assumed that m users, $u_1 \ldots u_m$, have rated an asset, comprising a series of i items, $i_1 \ldots i_n$. These items may be any type of items, suitable for rating, such as e.g. movies, music or books. It is also assumed that all rating data is represented by a stored dataset that is accessible to the suggested estimating mechanism.

Figure 4:
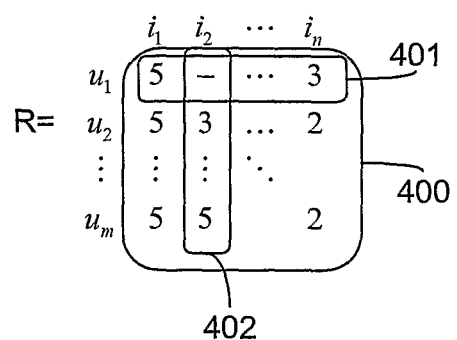
FIG. 4 is an illustration of a user-item matrix R, comprising one example of rated items.

As indicated above, practically all users have normally only rated a few items, and thus each user row of a user-item matrix will comprise rates that have been appointed to some items by the reference user, while other positions associated with un-rated items are left blank. Such an exemplary matrix 400 is shown in FIG. 4. As indicated with row 401 of FIG. 4, user, $u_1$, has rated a 5 for item $i_1$ and a 3 for item $i_n$, while no rate has been given for item $i_2$. In this case the suggested method therefore can be used for estimating a default rating for this item. The default rating value for item $i_2$ will be selected according to the rating profile of the user and the representative value will be inserted into the series of rates. Once added to the dataset, the procedure may be repeated for additional missing rating values, before the series of ratings are used in any type of appropriate processing.

Figure 5:
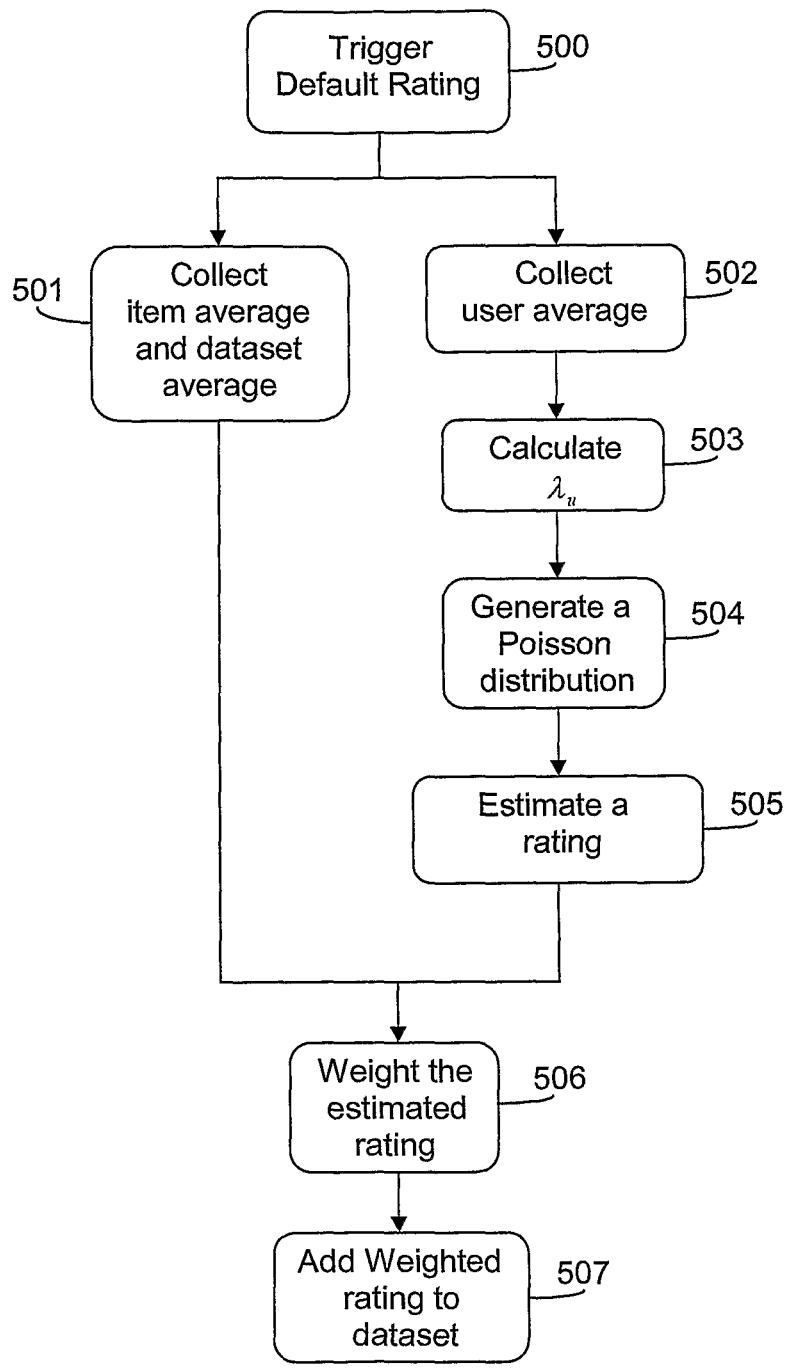
FIG. 5 is a flow chart illustrating a method for inferring a default rating for an unrated item on the basis of a Poisson distribution.

In a first step 500 of FIG. 5, a trigger for deriving a default rating for a specific item of a reference user for which a rated value is missing is recognised. In response to this trigger, data that is required for the default rating estimation has to be collected. In a step 501 the item average rating, $i_r$, and the dataset average rating, $d_r$, is collected from a data storage. For item $i_2$ of the matrix of FIG. 4, $i_r$, is calculated on the basis of all rates of column 402, while $d_r$, is calculated on the basis of all ratings of matrix 400. When estimating a default rating for a particular item that items average rating will be required in step 501. However, in order to be able to repeat the procedure for additional items, step 501 may disclose that each item for which a rating is missing are identified, and that the average ratings for each of these items are calculated at this step. Alternatively, the average rating for all items may be calculated, thereby enabling the respective average value to be retrieved once it is needed for estimation. In addition the user's average rating for the reference user, $\overline{R}_u$, e.g. the average rating of all rated items of row 401 of FIG. 4, is collected in another step 502.

In a subsequent step 503, a λ is calculated for the user's average rating, according to formula (2). $\lambda_u$ is then used for generating a Poisson distribution which will reflect the rating profile of the reference user. This procedure is indicated with a next step 504. In a subsequent step 505, the relevant Poisson distribution is used for estimating a random default rating, or a random Poisson distributed rating, $u_r$, for the reference user and the relevant item. In order to obtain a default rating that reflects the distribution of both the reference user's ratings and the items ratings, the estimated random default rating, $u_r$, is then weighted, using formula (8), as indicated with a step 506. In a next step 507, the weighted default rating value is added to the dataset. Typically the updated dataset is then stored in a database, enabling a processing entity, such as e.g. a recommender, to use the dataset for executing a recommending service, whenever required. Alternatively, the weighted default rating may be processed by a processing unit on the fly, without any intermediate storing.

Figure 6:
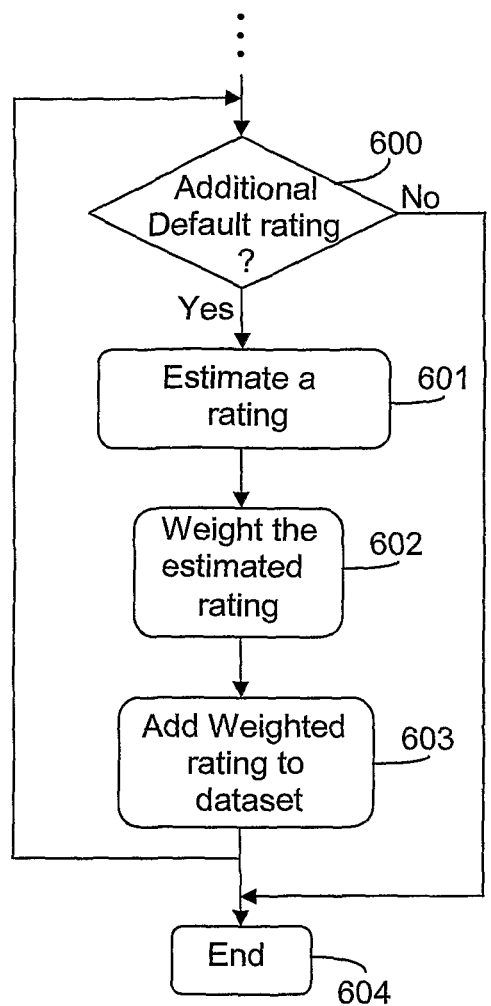
FIG. 6 is a flow chart illustrating how the method described with reference to FIG. 5 can be repeated for two or more unrated items.

In a typical scenario, the default rating method described above is repeated for all items for which no rate has been given by the reference user, thereby completing the series of ratings associated with the reference user. For the given example this means that after having completed the default rating procedure for the respective reference user, all positions of user row 401 of FIG. 4 will have a representative rating value, each of which have been given either by the reference user, or as a result of an estimating and weighting procedure using the proposed default rating method. Such a repeated rating procedure may be executed as illustrated with the flowchart of FIG. 6.

Subsequent of having calculated a first default rating value, as indicated above with reference to FIG. 5, it is determined whether any additional default rating is required for any additional item. This is indicated with a step 600 in FIG. 6. If this is the case, another random Poisson distributed default rating will be calculated, as indicated with a step 601. The default rating is weighted for the present item, as indicated with a next step 602, and the weighted default rating is added to the dataset in another step 603. This procedure is then repeated for the remaining un-rated items of the reference user, before the default rating procedure is terminated with a final step 604.

In order for the default rating procedure to be able estimate a default value for a plurality of items, the average rating for all of these un-rated items has to be accessible for the calculating means, and, thus, unless a default rating of only one item is required, step 501 of FIG. 5, should preferably include the step of calculating the average item for all un-rated items, as indicated above.

As already mentioned, the result from the suggested default rating method described above is typically stored in a database from where the data can be retrieved and used for any kind of appropriate data processing, such as e.g. forming the basic input data for a recommender service. An exemplification of a system architecture according to one embodiment, which is arranged to update a dataset with default rating data on the basis of the default rating scheme described above, will now be described in further detail with reference to FIG. 7.

As is illustrated in the figure, end users can connect to a device of the default rating system 700 which is adapted to collect rates given by the end users, via a respective user equipment (UE) 702a,b. Such a device is typically referred to as a rating engine 701. The UE's may be any type of stationary of wireless device, such as e.g. a PC, a laptop, a cellular telephone or a Set-Top Box, which is adapted to provide some kind of rating service to the user. Although only two UEs are shown in the figure, it is to be understood that a typical system architecture of the presented type is configured to handle a considerable amount of UEs more or less simultaneously.

Ratings collected from the UEs 702a,b by the rating engine 701 are stored in a data storage entity, here referred to as a rating database 703, where a rating entry is kept for each user and item. The default rating system 700 also comprises an entity, here referred to as a statistics engine 704, which is adapted to calculate the previously described average values that are needed for estimating the Poisson distributed default ratings. Another entity, here referred to as a default rating engine 705, uses the average values calculated by the statistics engine 704, together with relevant rated data collected from the rating database 703, as a basis for computing one or more required default rating values, according to the suggested default rating method. The one or more default rating values calculated by the default rating engine 705 are then added to the respective dataset and typically stored in a data storage, adapted therefore. Here such a data storage is referred to as a default rating database 706. The rating data stored in the default rating database 706 can then be accessed by a processing entity, such as e.g. a recommender. Alternatively the updated rated data may instead be collected by any external entity 707 that requires default rated data, without any intermediate storage.

The suggested default rating method may be executed in the following manner. The rating engine 701 receives one or more ratings from UEs 702a,b, as indicated with steps 7:1a and 7:1b, respectively, and the collected ratings are stored in the rating database 703 in subsequent steps 7:2a and 7:2b, respectively. It is to be understood that in a typical scenario, a rating matrix of the rating database 701 is continuously updated by rating data collected by the rating engine 701 from various UEs.

In a subsequent step 7:3 the default rating engine 705 is triggered to execute a default rating procedure, by any kind of external or internal trigger entity, here represented by the external trigger entity 708. Such a trigger may e.g. have been initiated by a user requesting a service which is dependent on rating data, or by any process requesting rating data, that has been updated with one or more default ratings. In response to such a trigger the default rating engine 705 requests the statistics engine 704 to calculate the required average data mentioned above. Such a request is indicated with another step 7:4. The statistics engine 704 collects the required data from the rating database 703 in a subsequent step 7:5, and executes the required computations in a next step 7:6, after which the result is collected by the default rating engine 705, as indicated with a next step 7:7. In another step 7:8, the relevant dataset of ratings is collected from the rating database 703, and in a subsequent step 7:9 the collected rating data is used for estimating one or more required default rating values. The derived rating data is typically provided to a default rated database 706 for storage as indicated with a step 7:10a. As mentioned above, the result may alternatively be collected by an external entity 707 for processing of the updated rated dataset on the fly, as indicated with the optional step 7:10b.

Figure 8:
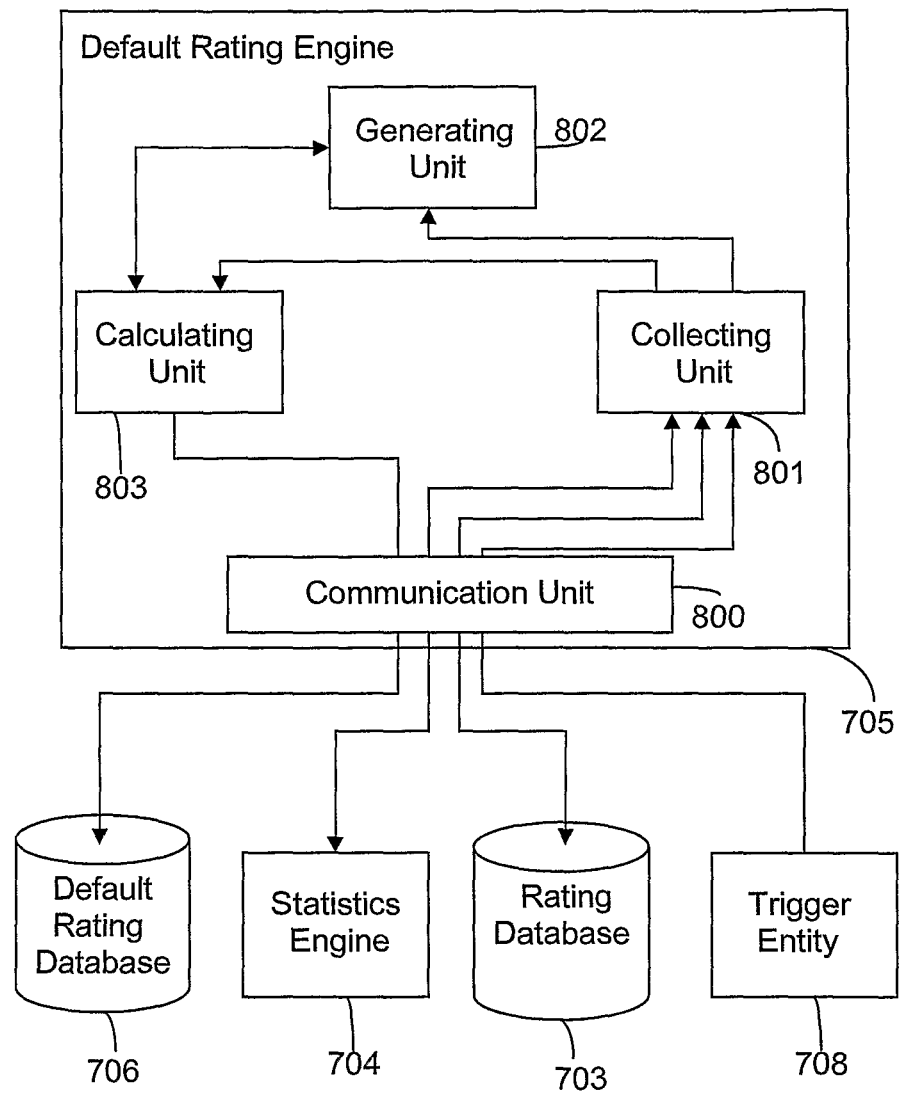
FIG. 8 is a block scheme illustrating an apparatus according to one exemplary embodiment which is adapted to execute the default rating method described with reference to FIGS. 5 and 6.

A system, such as the one described above may comprise various conventional processing and storing entities together with an entity, e.g. a default rating engine, which is specially adapted to execute the suggested default rating method. Such a default rating engine, according to one exemplary embodiment, will now be described below with reference to FIG. 8.

The default rating engine 705 comprises a communication unit 800, which is adapted to communicate with any internal and/or external entities which may require default rating data, such as e.g. a default rating database, as well as with entities adapted to provide rating data, such as e.g. a rating database, and associated processed data, such as e.g. a statistics engine. The default rating engine 705 is adapted to initiate a default rating calculating process in response to a trigger. According to the present embodiment such a trigger is recognised by a collecting unit 801. Once the trigger has been recognised by the default rating engine, rating data has to be collected from the respective data sources and processed accordingly. The collecting unit 801, is adapted to collect the relevant rating dataset from a database, as well as to collect the relevant processed average data from a processing entity, such as e.g. a statistics engine.

The default rating engine 705 is also adapted to generate a Poisson distribution according to the principles described above. According to the exemplified embodiment this is achieved by a generating unit 802. The exemplified default rating engine 705 also comprises a calculating unit 803, which is adapted to estimate one or more default rating values for a reference user on the basis of the generated Poisson distribution, and to weight the calculated default rating values accordingly, before they are added to the relevant dataset. The default rating engine is also adapted to store the updated dataset in a database or to allow an external entity to retrieve the rated dataset directly, without any intermediate storing.

It is to be understood that the default rating engine that has been described above is merely one possible exemplification of an apparatus comprising generic functionality which is suitable for executing a default rating method which is based on a Poisson distributed rating. For simplicity reasons, only entities necessary for the understanding of the basic principles, and functionality on focus in this document, have been presented and discussed. The generating and the calculating procedures executed by the generating unit 802 and the calculating unit 803, respectively, may for example be executed by one singe unit, instead of by separate units. In an alternative embodiment the default rating engine may also comprise an integrated statistics engine, and/or one or more integrated databases.

Estimating default ratings that reflects both the user's rating behaviour as well as the general publics' average ratings given for an item on the basis of the general principles described above will result in several advantages.

Since the suggested method enables a users rating profile to be maintained to a higher degree, such rating data will be more accurate e.g. when used by a recommending system, such that items that are unknown to the user but that has been highly rated by a neighbour will be recommended more often than other items. This is due to that high ratings will be better reflected in the estimated default ratings and will be included as another dimension in the dataset.

In addition, due to the proposed default rating method, a dataset will not be "flattened out" due to interference, as is often the case when averages are used as default ratings by a conventional default rating system.

Finally, by using three statistical measures combined together, more dimensions are considered when calculating a default rated dataset than what is used by a conventional measuring means.

Trough out this document, the terms used for expressing functional devices, entities or nodes, such as e.g. "rating engine", "default rating engine", "default rating database" and "rating database", as well as various units of the described devices, entities or nodes, such as e.g. "recognising unit", "generating unit" and "collecting unit" should be interpreted and understood in its broadest sense as representing any type of devices, entities, nodes or units which have been adapted to process and/or handle correlation data, according to the general principles presented in this document.

In addition, while the described method and apparatus has been described with reference to specific exemplary embodiments, such as e.g. for use by a recommender, the description is generally only intended to illustrate the inventive concept and should not be taken as limiting the scope of the described concept, which is defined by the appended claims.

The invention claimed is:

1. A method implemented by a default rating engine for estimating a default rating given to an item in a rated dataset by a reference user that has not yet explicitly rated that item, wherein said rated dataset comprises one or more series of ratings made by one or more respective users, each series comprising ratings of at least two items, said method comprising:
recognizing a trigger for estimating said default rating;
collecting an item average rating as the average rating given to said item by one or more users other than the reference user, a reference user average rating as the average rating given to other items by the reference user, and a dataset average rating as the average rating given to all items in the rated dataset by all users;
generating a Poisson distribution of ratings given by the reference user on the basis of the reference user average rating,
calculating a random Poisson rating on the basis of said Poisson distribution, and
estimating said default rating by weighting said random Poisson rating on the basis of the item average rating, the reference user average rating, and the dataset average rating.

2. The method according to claim 1, wherein said generating comprises generating the Poisson distribution as:

$$\text{probability}(r, \lambda_u) = \frac{\lambda_u^r e^{-\lambda_u}}{r!}$$

where r is a rate for user u and $\lambda_u$ is a value within $\min(R)+1 \leq \lambda_u \leq \max(R)$, R being the set of all possible ratings.

3. The method according to claim 2, wherein $\lambda_u$ comprises $$\lambda_u = a\overline{R}_u + b$$

where
$\overline{R}_u$ is the said reference user average rating, $$a = 1 - \frac{1}{\max(R) - \min(R)}$$

and $$b = \frac{\max(R)}{\max(R) - \min(R)}.$$

4. The method according to claim 1, wherein estimating said default rating comprises estimating said estimated default rating as:

$$\hat{r}(\lambda_u) = \frac{u_{num} \cdot u_r + i_{num} \cdot i_r + d_{avgNum} \cdot d_r}{u_{num} + i_{num} + d_{avgNum}}$$

where $i_r$ is said item average rating, $d_r$ is said dataset average rating, $u_r$ is said random Poisson rating, $u_{num}$ is the number of explicit ratings made by the reference user, $i_{num}$ is the number of explicit ratings given to said item, and $d_{avgNum}$ is the average number of ratings given to each item in the dataset.

5. The method according to claim 1, wherein said method is executed for estimating default ratings given to one or more additional items by the reference user, and further comprises collecting the average rating given to each of said one or more additional items by one or more users other than the reference user, and repeating said calculating and said estimating for each of said one or more additional items.

6. The method according to claim 1, further comprising adding said estimated default rating to said rated dataset.

7. The method according to claim 6, further comprising using said dataset to generate personalized recommendations for said reference user.

8. The method according to claim 1, wherein said collecting comprises collecting the item average rating, the reference user average rating, and the dataset average rating from a statistics engine.

9. An apparatus configured to estimate a default rating given to an item in a rated dataset by a reference user that has not yet explicitly rated that item, wherein said rated dataset comprises one or more series of ratings made by one or more respective users, each series comprising ratings of at least two items, said apparatus comprising one or more processors configured to implement:
   a collecting unit configured, responsive to recognizing a trigger for estimating said default rating, to collect an item average rating as the average rating given to said item by one or more users other than the reference user, a reference user average rating as the average rating given to other items by the reference user, and a dataset average rating as the average rating given to all items in the rated dataset by all users,
   a generating unit configured to generate a Poisson distribution of ratings given by the reference user on the basis of the reference user average rating,
   a calculating unit configured to calculate a random Poisson rating on the basis of said Poisson distribution, and to estimate said default rating by weighting said random Poisson rating on the basis of the item average rating, the reference user average rating, and the dataset average rating.

10. The apparatus according to claim 9, wherein said apparatus is further configured to estimate default ratings given to one or more additional items by the reference user, said collecting unit configured to collect the average rating given to each of said one or more additional items by one or more users other than the reference user, and the calculating unit configured to repeat said calculating and said estimating for each of said one or more additional items.

11. The apparatus according to claim 9, wherein said apparatus is further configured to add said estimated default rating to said dataset.

12. The apparatus according to claim 11, wherein said apparatus is further configured to provide said dataset to a database.

13. The apparatus according to claim 11, wherein said apparatus is further configured to provide said dataset to a processing device.

14. The apparatus according to claim 9, wherein the generating unit is configured to generate the Poisson distribution as:

$$\text{probability}(r, \lambda_u) = \frac{\lambda_u^r e^{-\lambda_u}}{r!}$$

where r is a rate for user u and $\lambda_u$ is a value within $\min(R)+1 \leq \lambda_u \leq \max(R)$, R being the set of all possible ratings.

15. The apparatus according to claim 14, wherein $\lambda_u$ comprises $$\lambda_u = a\overline{R}_u + b$$

where
$\overline{R}_u$ is the said reference user average rating, $$a = 1 - \frac{1}{\max(R) - \min(R)}$$

and $$b = \frac{\max(R)}{\max(R) - \min(R)}.$$

16. The apparatus according to claim 9, wherein the calculating unit is configured to estimate said estimated default rating as:

$$\hat{r}(\lambda_u) = \frac{u_{num} \cdot u_r + i_{num} \cdot i_r + d_{avgNum} \cdot d_r}{u_{num} + i_{num} + d_{avgNum}}$$

where $i_r$ is said item average rating, $d_r$ is said dataset average rating, $u_r$ is said random Poisson rating, $u_{num}$ is the number of explicit ratings made by the reference user, $i_{num}$ is the number of explicit ratings given to said item, and $d_{avgNum}$ is the average number of ratings given to each item in the dataset.

17. A system configured to estimate a default rating given to an item in a rated dataset by a reference user that has not yet explicitly rated that item, wherein said rated dataset comprises one or more series of ratings made by one or more respective users, each series comprising ratings of at least two items, said system comprising:
   a rating database for storing said dataset,
   a default rating engine comprising one or more processors configured to implement:
      a collecting unit configured, responsive to recognizing a trigger for estimating said default rating, to collect an item average rating as the average rating given to said item by one or more users other than the reference user, a reference user average rating as the average rating given to other items by the reference user, and a dataset average rating as the average rating given to all items in the rated dataset by all users
      a generating unit configured to generate a Poisson distribution of ratings given by the reference user on the basis of the reference user average rating,
      a calculating unit configured to calculate a random Poisson rating on the basis of said Poisson distribution, and to estimate said default rating by weighting said random Poisson rating on the basis of the item average rating, the reference user average rating, and the dataset average rating.

18. The system according to claim 14, wherein said system further comprises a rating engine configured to collect user ratings and to store said ratings in said rating database.

19. The system according to claim 14, wherein said system further comprises a default rating database configured to store a default rated dataset.

* * * * *

UNITED STATES PATENT AND TRADEMARK OFFICE
CERTIFICATE OF CORRECTION

PATENT NO. : 8,429,175 B2  
APPLICATION NO. : 13/124466  
DATED : April 23, 2013  
INVENTOR(S) : Lidström et al.

Page 1 of 1

It is certified that error appears in the above-identified patent and that said Letters Patent is hereby corrected as shown below:

On the Title Page, Item (75), under "Inventors", in Column 1, Line 2, delete "Bjork," and insert -- Björk, --, therefor.

On the Title Page, Item (75), under "Inventors", in Column 1, Line 2, delete "Stockhollm" and insert -- Stockholm --, therefor.

On the Title Page, Item (75), under "Inventors", in Column 1, Line 3, delete "Soderberg," and insert -- Söderberg, --, therefor.

Figure 7:
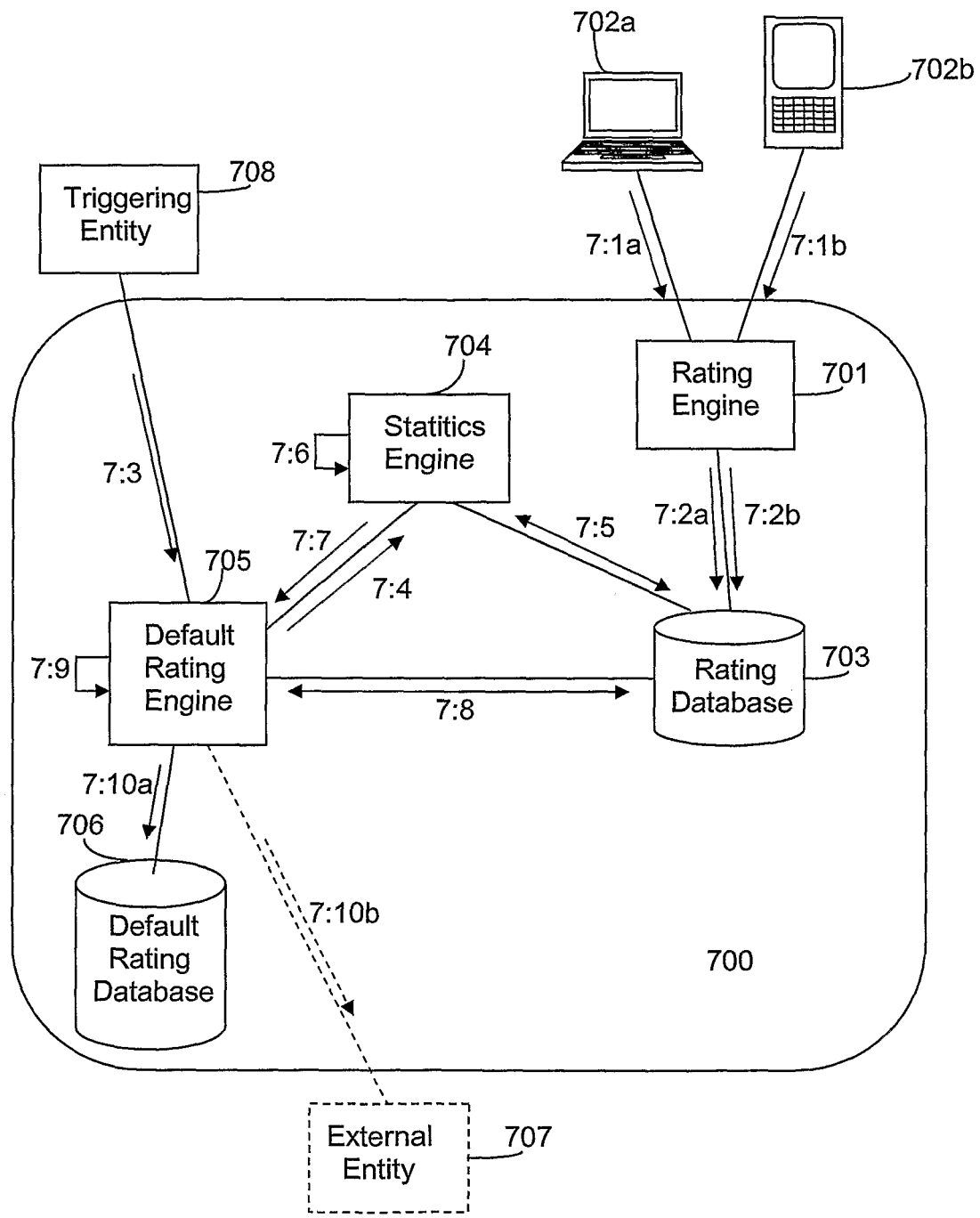
FIG. 7 is an illustration of a system architecture comprising functionality for enabling inferring of default ratings on the basis of the method described with reference to FIGS. 5 and 6.

In the Drawings:

In Fig. 7, Sheet 5 of 6, for Tag "704", in Line 1, delete "Statitics" and insert -- Statistics --, therefor.

In the Specification:

In Column 1, Line 14, delete "extend," and insert -- extent, --, therefor.

In Column 1, Line 57, delete "row-vector," and insert -- row-vector, $i_1 .. i_n$, --, therefor.

In Column 4, Line 58, delete "A" and insert -- $\lambda$ --, therefor.

In Column 6, Line 57, delete "2" and insert -- $\lambda_n$ --, therefor.

In Column 6, Line 58, delete "$A_u$" and insert -- $\lambda_u$ --, therefor.

In Column 9, Line 27, delete "singe" and insert -- single --, therefor.

Signed and Sealed this  
Eighth Day of October, 2013

Teresa Stanek Rea  
*Deputy Director of the United States Patent and Trademark Office*